US005673193A

United States Patent [19]

Brust et al.

[11] Patent Number: 5,673,193

[45] Date of Patent: Sep. 30, 1997

[54] SYSTEM AND METHOD FOR PROCESSING BULK MAIL

[75] Inventors: Jonathan Brust, New York, N.Y.; Peter Kraft, Tenafly, N.J.

[73] Assignee: Creative Media Generations, Inc., New York, N.Y.

[21] Appl. No.: 517,506

[22] Filed: Aug. 21, 1995

[51] Int. Cl.$^6$ .............................. G07B 17/02; G06F 19/00

[52] U.S. Cl. .............................. 364/464.16; 364/478.07; 364/478.08; 364/478.1

[58] Field of Search .............................. 364/148, 464.02, 364/464.03, 478.01, 478.07, 478.08, 478.11, 464.16

[56] References Cited

U.S. PATENT DOCUMENTS

| | | | |
|---|---|---|---|
| 4,639,873 | 1/1987 | Baggarly et al. | 364/466 |
| 4,800,505 | 1/1989 | Axelrod et al. | 364/478.09 |
| 4,829,443 | 5/1989 | Pintsov et al. | 364/464.03 |
| 4,907,161 | 3/1990 | Sansone et al. | 364/464.02 |
| 4,959,795 | 9/1990 | Christensen et al. | 364/478.08 X |
| 5,051,914 | 9/1991 | Sansone et al. | 364/478 |
| 5,068,797 | 11/1991 | Sansone et al. | 364/478 |
| 5,072,401 | 12/1991 | Sansone et al. | 364/478 |
| 5,079,714 | 1/1992 | Manduley et al. | 364/478 |
| 5,119,306 | 6/1992 | Metelits et al. | 394/464.02 |
| 5,229,932 | 7/1993 | Connell et al. | 364/464.02 |
| 5,245,545 | 9/1993 | Taylor | 364/478.07 |
| 5,247,196 | 9/1993 | Kimura | 257/303 |
| 5,262,939 | 11/1993 | Vanpoucke | 364/406 |
| 5,283,752 | 2/1994 | Gombault et al. | 364/478.09 |
| 5,367,450 | 11/1994 | Pintsov | 364/401 R |
| 5,388,049 | 2/1995 | Sansone et al. | 364/464.02 |
| 5,459,670 | 10/1995 | Johnson et al. | 364/478.12 |
| 5,493,500 | 2/1996 | Boorsma | 364/464.02 |

OTHER PUBLICATIONS

Advertising Brochure for Paragon Direct of Milwaukee, WI; pp. 1–13.

Advertising Brochure for Paragon Direct of Milwaukee, WI: pp. 1–2.

*Primary Examiner*—Edward R. Cosimano

*Attorney, Agent, or Firm*—Londa and Traub LLP

[57] ABSTRACT

The invention relates to a system and method for processing a mailing consisting of a plurality of identical printed items to be grouped into bundles having an identical general address. Information as to bulk mailing centers (BMC) is accessed, which information provides an associated BMC for each group of zip codes, based generally on geographical proximity to a certain BMC. Information as to postal zones and rates to a particular zip code from the BMCs is also accessed, so that postal rates for each bundle can be calculated. Addressee information is provided to the system, including a general address having a zip code and particularized information for each addressee. The addresses should preferably be compatible with the particular bulk mailing procedures being used. Alternatively, the addresses can be screened for compatibility after being input into the system. The labeling, bundling and palletizing of the items are optimized for maximum efficiency.

64 Claims, 3 Drawing Sheets

SYSTEM AND METHOD FOR PROCESSING BULK MAIL

BACKGROUND OF THE INVENTION

This invention relates to a system and method for processing bulk mail. In particular, the invention relates to the processing of specific types of bulk mail for delivery as fourth class, zone-rated mail pursuant to special procedures promulgated by the United States Postal Service (USPS).

The USPS provides for various types of mailing procedures which can be utilized for bulk mailing. Typically, these procedures require advanced grouping, sorting and labeling by the mailing party, along with the preparation of required compliance documentation. This results in a simplified delivery process for the USPS, while affording the mailing party significantly reduced postal rates. However, the regulations pertaining to bulk mailing procedures are often quite specific, providing both a minimum and maximum, as to size and weight of the item, size and weight of a bundle, address type and information required, as well as other limitations. Therefore, it is difficult to simultaneously reconcile the different requirements so as to maximize the savings opportunities provided.

A particular type of bulk mailing is known as fourth class, zone-rated mail (hereinafter referred to generally as "4ZR"), and described further in the Postal Service Domestic Mail Manual at sections E400 and E070. A specific type of 4ZR is known as "bound printed matter", or BPM, which generally consists of catalogs, books, magazines, etc. The procedure is especially geared towards those mailers sending large numbers of identical items to specific types of addresses. The items must be bound in bundles conforming to specific size and weight requirements. Each bundle must be sent to a single general address, while each item within a bundle may have a specific address, such as a box number at the general address. It can therefore be seen that this type of mailing can only be practicable for certain types of addressees, i.e. those living at general addresses such as dormitories, military installations, large office buildings, etc. Nevertheless, when 4ZR procedures are utilized, it can result in a significant cost savings to the mailer.

Once the bundles are formed, they may then be grouped (i.e. bagged or palletized) according to further parameters, whereby each group contains only bundles going to a certain, specified bulk mailing drop center (BMC). "BMC" is also defined herein to include other types of drop centers, such as a sectional center facility (SCF) or an area sectional facility (ASF). The bags or pallets may be delivered directly by the mailer to the appropriate BMC, in order to realize further cost savings. (Further reference herein to one of the terms "bag" and "pallet" should be considered to apply equally to the other term.) The USPS takes over from that point, delivering the bundles to the appropriate general address. However, the final step, placing each item from the bundles into the appropriate mail box, is done typically by an employee of the building, but in any case by someone other than a USPS employee. The activities required by the USPS are thereby kept to an absolute minimum.

While it is clear that the utilization of the 4ZR procedure can result in great savings, many mailers do not take advantage of the procedure because of the arduous regulations, which require decisions to be made at almost every step. Furthermore, the necessity for providing confirming documentation to the USPS can also be time consuming. In addition, even those mailers who do use the 4ZR procedure may be missing out on further savings by not being able to process the mailing so as to optimize the packaging and organization of the mailing.

There currently exist systems which can convert a pre-set computer-ready address list into a bundling and palletizing operation complying with USPS 4ZR minimum/maximum requirements, including sorting for 4ZR acceptability, assigning BMC location, assigning zones, sorting to USPS pallet requirements, generating computer tapes for labeling apparatus, and generating mailing manifest and postal statements. However, these existing systems suffer from drawbacks with respect to flexibility and optimization.

It is therefore an object of the present invention to provide a system and method for organizing a mailing operation to utilize 4ZR procedures, by accessing and processing raw general addressee data in the form of an array of parameters, in order to generate specific individual addressee information.

It is a further object of the invention to insure access to the lowest possible postal rates by optimizing the assigning of BMC locations to individual bundles.

It is a still further object of the invention to increase efficiency of a bulk mailing system by automatically maximizing each bundle.

SUMMARY OF THE INVENTION

The invention comprises a system and method for processing a mailing consisting of a plurality of identical printed items to be grouped into bundles having an identical general address. Information as to bulk mailing centers (BMC) is accessed, which information provides an associated BMC for each group of zip codes, based generally on geographical proximity to a certain BMC. Information as to postal zones and rates to a particular zip code from the BMCs is also accessed, so that postal rates for each bundle can be calculated. Addressee information is provided to the system, including a general address having a zip code and particularized information for each addressee. The addresses should preferably be compatible with the particular bulk mailing procedures being used. Alternatively, the addresses can be screened for compatibility after being input into the system.

In a preferred embodiment, the optimization of mailing sites may then be accomplished by temporarily associating each bundle with a first BMC chosen from the accessed information, which will generally result in associating the closest, most cost effective BMC. Since the procedure may have a minimum bundle requirement to use a particular BMC, the total number of bundles assigned temporarily to each BMC is calculated and compared with the minimum requirement. If a certain first BMC does not have the minimum number of bundles assigned to it, the system may then provide a default BMC, usually the next closest BMC, for all bundles temporarily addressed to the first BMC. The system again checks the BMCs to be sure that even the default BMCs have the minimum number of bundles assigned. Alternatively, in order to further maximize cost savings, each bundle temporarily associated to a rejected first BMC can be analyzed by its zip code to determine individually the closest BMC, which may vary for different zip codes within a certain BMC group zone. Final BMC destinations are then assigned and stored for each bundle.

The particular mailing requirements may set a maximum weight per bundle. Therefore, there is a need to calculate the maximum number of items of a given weight which can be grouped in a bundle, such that each bundle weighs less than or equal to a given maximum allowable weight. Since the procedures are used for a large number of identical items, a representative item can be weighed manually, or automatically, with the item weight being input and stored in the system. Alternatively, in the absence of the actual item, parameters describing the item, including paper sheet weight, paper sheet size, and number of sheets of a particular weight and size per item, strap and shrink-wrap weights, can be input, with the item weight being calculated by the system.

Once the maximum number of items per bundle is calculated, a maximized bundle can be quantified, including the total weight of a maximized bundle. This total weight can then be combined with zone rate information to determine the mailing rate for each bundle. When forming the bundles, it is advantageous for mailing, bundling and organizing purposes, as well as for cost forecasting purposes, to form all bundles of an identical, maximized number of items. However, for certain types of mailings, such as direct mail letters, it may be desirable to form bundles of less than maximum permitted weight, in order to avoid having too many items per bundle. In that case, the maximum number (or any specific set number) may be programmed into the system for such a mailing according to the needs of the particular mailing. In addition, an idealized bundle may consist of a single piece of suitable weight.

Since all items in each bundle must be addressed to the same general address, a new bundle must be started when an item bearing a new general address is reached. (This assumes that the items have the individual addresses applied in succession within a general address grouping, which is of course preferable). While waste can be avoided by completing a bundle short if the general address grouping is finished without completing maximum bundle size, it is advantageous from a processing standpoint to simply complete the bundle to maximize size with filler items addressed to the general address. In practice, these extras are rarely wasted, as they tend to get picked up by individuals residing at the general address. This avoids the need to individually determine the number of items in each completed bundle, and then the weight and cost of each bundle, although this can be accomplished as part of the invention if desired. If it is desirable to use short completed bundles, the short bundles must be checked against the minimum weight requirement per bundle. By maximizing all bundles, the bundle weight will be the same for all bundles, and need not be calculated individually for each completed bundle. Also, the step of checking for minimum bundle weight can be avoided, along with extra required USPS paperwork and approval for submitting odd size bundles.

The determinations as to bundling, including new bundle start indication and filler address needed, can then be communicated with addressee information to prepare a final addressee list. This information can be communicated to a labeling apparatus, and to a bundling apparatus, so that the items can be labeled and bundled in an optimized manner. The result is that there will be no need for manual checking, filling, or completing of bundles, since the addressee information should be synchronized with the bundling operation.

Once the addressing and bundling operation is complete, the bundles may optionally be organized and loaded onto pallets (also known as containers) or into bags, which pallets or bags may then be transported and dropped at the BMCs. Preferably, the system will automatically tally the total number of bundles and weight going to a particular BMC, and organize the bundles on the pallets or in the bags so that minimum and maximum total weight per each pallet or bag will be satisfied. The system may be set up so that if minimum pallet requirements are not met, the bundle grouping can default to a bag, which will also have weight requirements which must be satisfied. This information can be determined even before the bundling stage, so that a pallet or bag number can be assigned to each completed bundle so as to satisfy optimum palletizing or bagging. In assigning a pallet number, it is preferable to insure that bundles bearing the same general address be kept together on the same pallet if at all possible.

The invention also preferably provides for means to tally and calculate parameters describing the resulting mailing operation, as well as means for outputting the results in electronic or documentary form. This is especially useful for determining total cost of the mailing operation based on weight of each bundle compared to a particular zone rate within a BMC. Also, for both internal purposes, and for satisfying Postal Service reporting requirements, various reports can be prepared, including reports setting forth total number of items; items to a particular general address, zip code, pallet, or BMC; number of items, number of bundles, and weight per pallet; as well as any calculation using any of the parameters generated and stored during the operation of the system. Also, the system and method can be used to determine all of these parameters by way of modeling, before any printing, labeling, bundling, palletizing or mailing is undertaken.

It will be apparent that many of the steps of the invention can be advantageously accomplished by use of a computer or microprocessor. The various steps can be accomplished simultaneously, with information stored and then input into means for accomplishing other steps. Or, the steps can be accomplished separately, with the invention being practiced by linking various computing means together in communicating fashion. Also, some or all of the various steps can be accomplished within a single computing apparatus programmed appropriately. In this manner, it will be readily apparent that the functions of some or all of the various means of the invention can in fact be accomplished by a single means capable of performing those same functions.

DETAILED DESCRIPTION DESCRIPTION OF THE INVENTION

Figure 1:
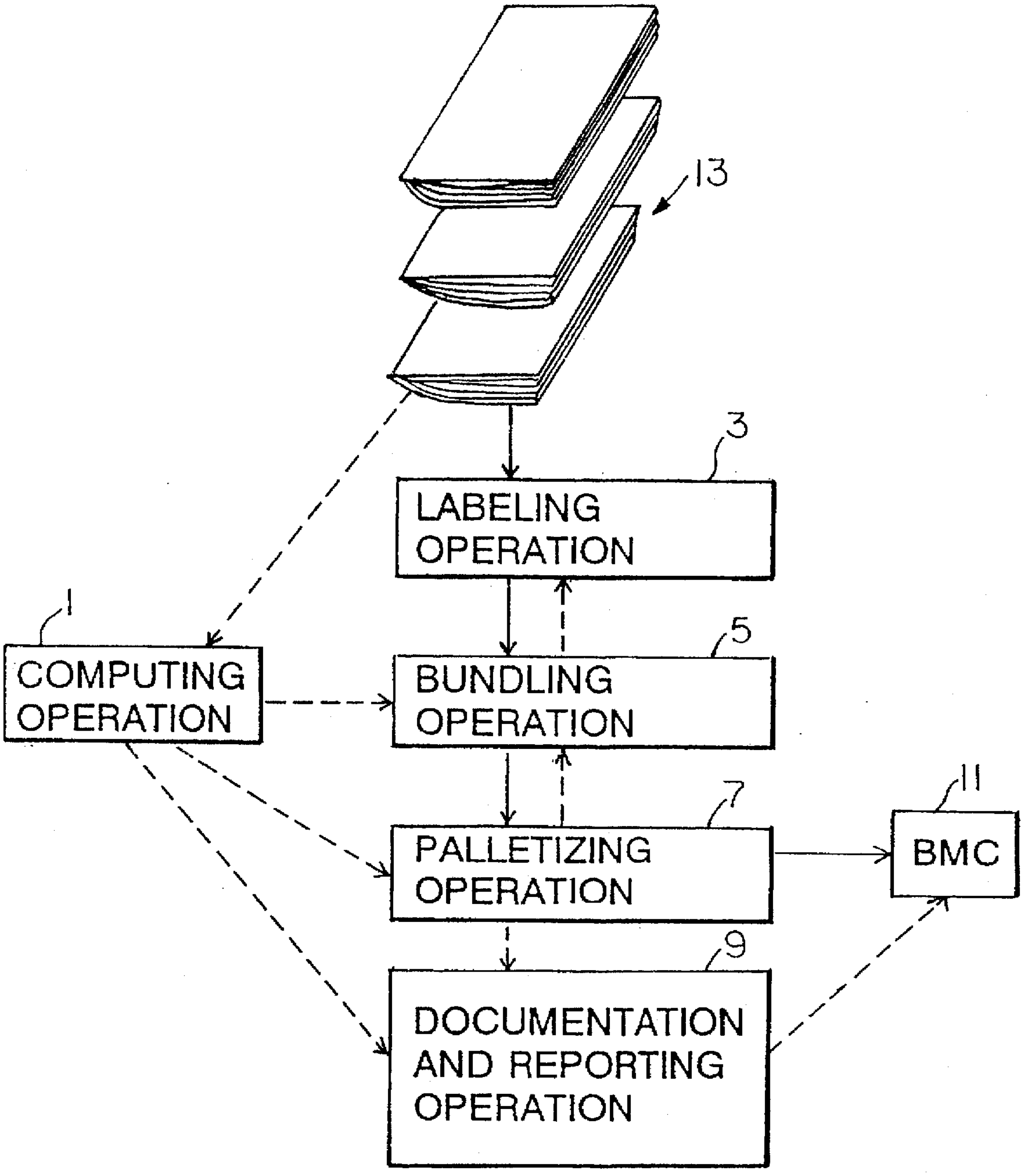
FIG. 1 is a diagram showing the organization of an embodiment of the system of the invention.
Figure 2A:
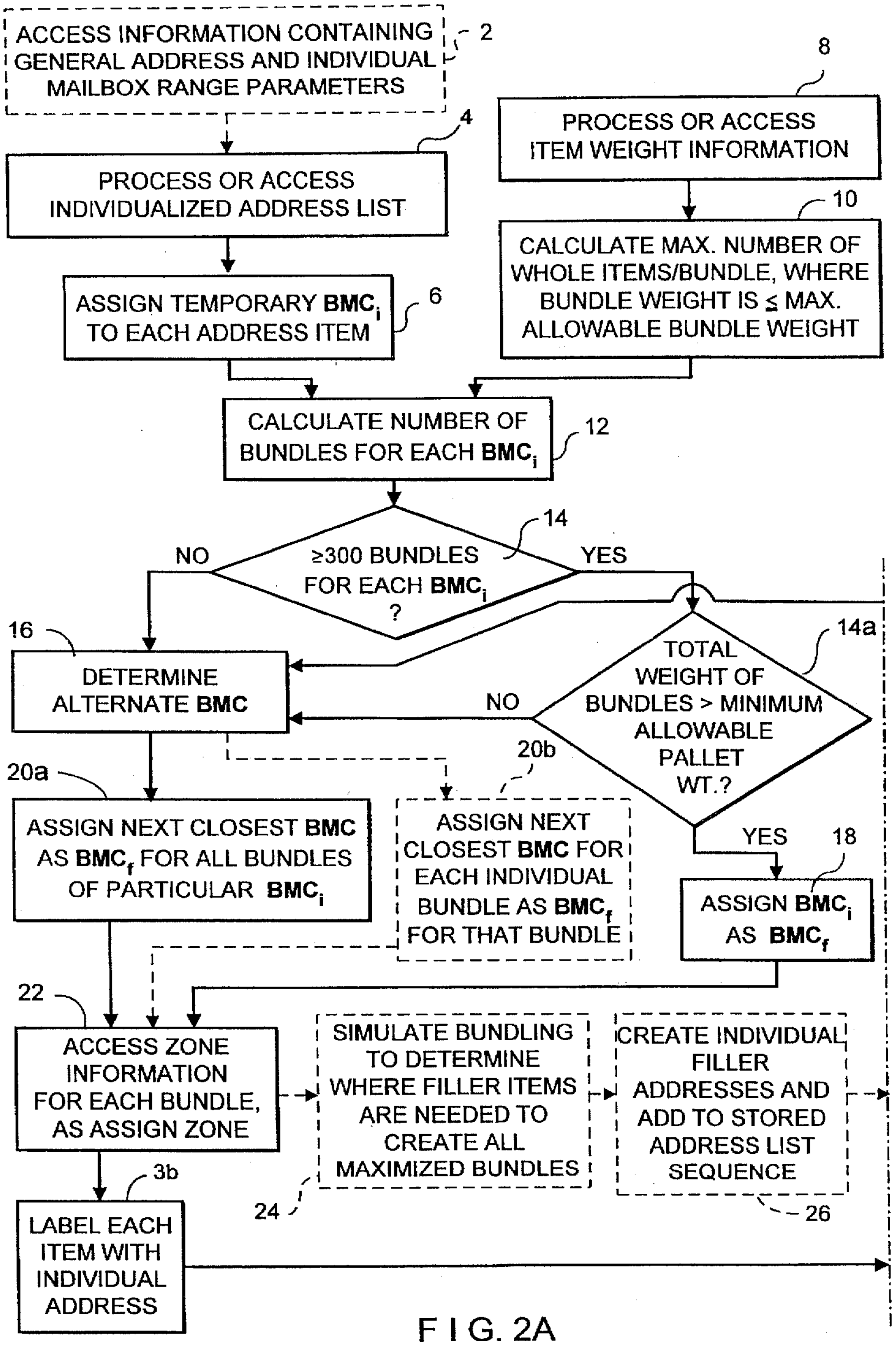
FIGS. 2A and 2B is a flow chart showing the steps of an embodiment of the invention.
Figure 2B:
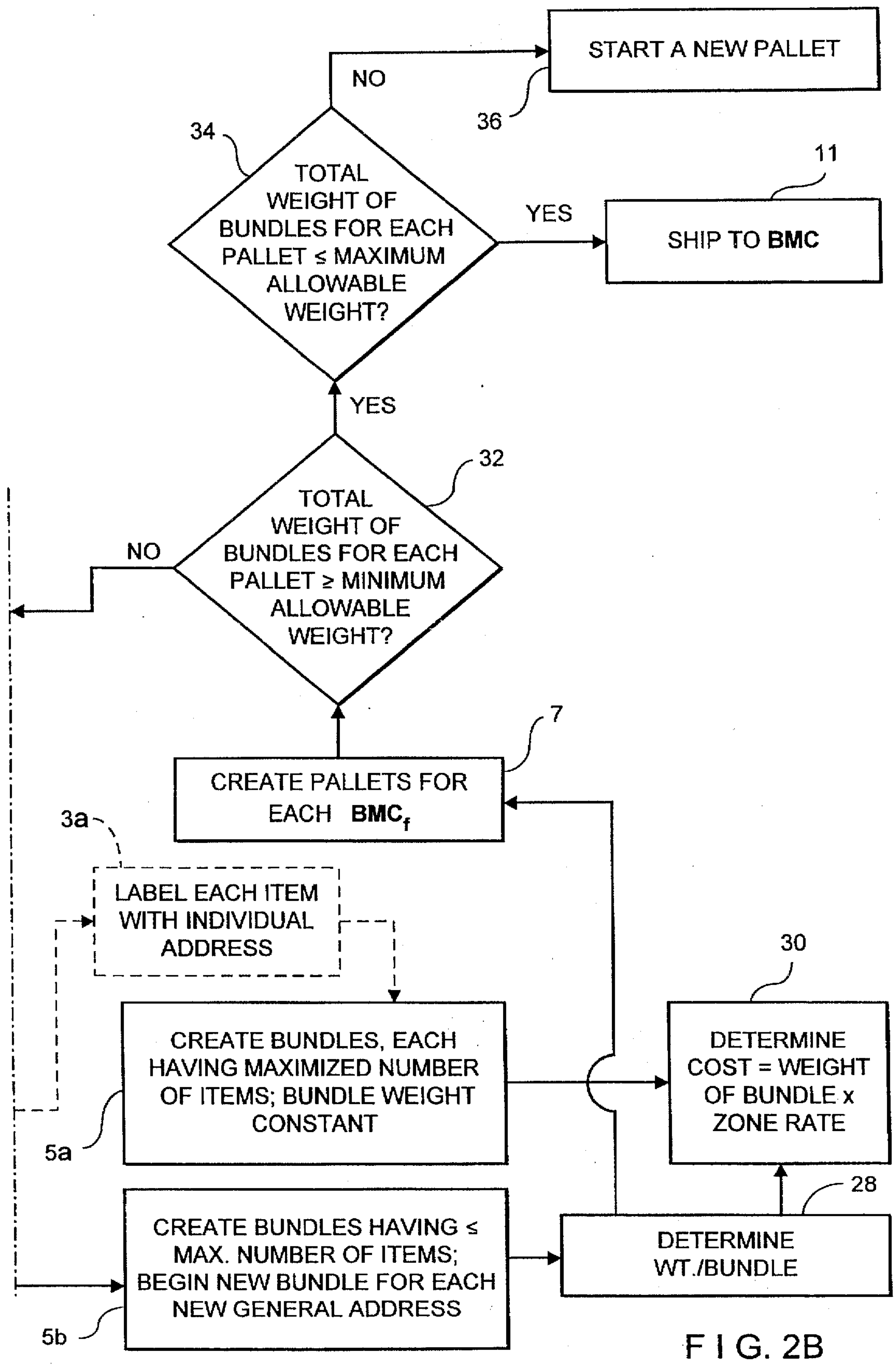

The invention will be described in association with the figures. FIG. 1 shows a schematic diagram of the system, where solid lines represent physical movement of the printed items to be mailed, and broken lines show lines of communication. FIGS. 2A and 2B represents a flow chart of the steps of operation capable of being performed by the system and method of the invention, where broken lines represent optional or alternate operating routes.

Although the invention can be used with any set of mailing parameters which require this type of organization, the invention is particularly applicable to mailing procedure allowed by the Unites States Postal Service under fourth class, zone-rated mail (4ZR), as set forth in regulations described above. Generally 4ZR regulations require that identical items (13) be bound in bundles (5) of a certain size, each bundle being addressed to the same general address. The bundles may then be organized on pallets or in bags (7)

containing a total weight of bundles within a certain range, each pallet or bag going only to a single BMC. The pallets or bags are then preferably dropped at the BMC (11) along with appropriate documentation, and the Postal Service then delivers each bundle, as is, to the general address indicated.

4ZR procedures are available only for certain types of addresses, i.e. those where individual addressees share a general address and where the USPS does not do the final sort. An example would be a college dormitory where each student living in the dormitory would share a general address such as Smith Hall, 100 Main Street, Peoria, Ill. 12345-9999, but would have an individual address including the general address and a mail box number. Mail is delivered by the Postal Service at a mail desk managed by the building or company, rather than being individually deposited in each mailbox by the Postal Service. An employee other than a USPS employee then places the mail in the appropriate box. For mailers who need to send identical printed material to a large number of people residing at these types of addresses, significant postal rate savings can be enjoyed by complying with the specific requirements of the Postal Service.

First, a suitable list of 4ZR compatible addresses needs to be generated (2). The address list can either be input into an address file of a microprocessing unit or computer (1), or can be accessible to the computer. The computer can also be programmed to check the accessed addresses for 4ZR compatibility, and to reject non-compatible addresses. In a preferred embodiment, the computer is programmed to accept and process group addresses along with individual address parameters (4), in the form of an array, rather than requiring that individual addresses be accessed in unitary fashion. The individual addresses at a general address can usually be characterized within a range of box numbers, which can be numeric, alphabetic, or alpha-numeric. For example, a general address may have 500 individual addresses, each identified by a box numbers running from 1–500. Alternatively, the box numbers may run from 1A to 1D, 2A to 2D, etc., or may be only even numbers. Therefore, the computer can be programmed to accept mail box string parameters which describe the pattern of mail boxes at a certain general address, and will then be programmed to itself generate the actual individual addresses. This greatly reduces the amount of information that needs to be stored or input.

A central processor or computer (1) also has input therein, or access to, information provided by the USPS regarding a correlation between each and every zip code (or range of zip codes) and the preferred bulk mailing center (BMC). If possible, an item should be dropped at the BMC appropriate for the zip code for that item, as it will generally be the closest and therefore most economical drop center. However, certain limitations, discussed below, may require dropping at an alternate BMC.

The central computer additionally has access to postal zone information, which sets forth a zone number, used to calculate the postal rate, the zone number being assigned to each zip code (or range of zip codes) from a particular BMC (22).

Each address is first temporarily assigned to a particular $BMC_i$ based on zip code from the preferred BMC list, and this information is stored (6). In the meantime, a weight A of the item is accessed (8), either as a known figure, or by way of a calculation performed by the computer based on the paper size, paper weight and number of pages which characterize the item. The computer then accesses information on the maximum bundle weight permitted B, and then calculates the maximum number of whole items C which may be bundled together (10). This may be done by taking the absolute value (i.e. greatest whole number) of B/A to equal C. A "maximized bundle" will contain the maximum number of items C. Furthermore, a total weight D for each identical, maximized bundle can then be calculated as C*A.

The computer keeps a running total of the number of items (12) (one address per item), as well as total number E of maximized bundles each containing C items, which are temporarily assigned to each BMC. The USPS regulations require that a minimum number of bundles be sent to a particular BMC in order for a particular mailing to be eligible for the 4ZR rate (14*a*). If a minimum required number of bundles F is set at 300, a comparison must be made to insure that E≧F (14). If yes (18), then the $BMC_i$ is assigned as the final $BMC_f$ for those bundles, i.e. those addresses, and the system proceeds to process the bundles at the bundling stage. If E<F, then a shipment can not be made to that particular BMC (16). A more direct option is that the system can automatically default the entire grouping of bundles originally assigned to a rejected $BMC_i$, and assign as $BMC_f$ for each address the nearest alternate BMC (20*a*). Alternatively, as the nearest BMC may not be the closest, and hence most economical, for each and every address, an individual comparison may be made for each address to identify and assign the most economical $BMC_f$ for each address (20*b*).

For the above operation, an estimated bundle count (14) can be achieved by simply dividing the number of individual addresses by the maximum number of items per bundle, for each temporary BMC. However, as will be discussed below, the precise number of bundles will not necessarily be determinable simply by knowing the number of addresses. Therefore, to determine the precise number of bundles per BMC (14), information gathered for instructing the bundling operation can be fed back into the above operation. With the aid of a computer, this would be determined well in advance of the actual bundling operation, and thus could be used when assigning a final BMC.

Once a $BMC_f$ has been assigned to each address, then the system moves to the bundling stage. The address information is communicated to a printing apparatus (3, 3*a*, 3*b*), which automatically applies the addresses to individual items. The bundles are then prepared by an automatic bundling apparatus (5) according to information receiving from the central processing unit (1) regarding bundle size. Furthermore, as each bundle can only contain items addressed to the same general address, the bundling apparatus should have access to address information from the central computer, or from the printing apparatus, so that a bundle can be completed, and a new bundle started, when a new general address is reached on the bundling assembly line. Alternatively, the bundling apparatus could have means for optically reading the addresses of the items passing through in order to make a determination regarding when to start a new bundle.

At this point, there are two options for completing bundles. Bundles can be completed as soon as a new general address is detected for the next item set for bundling. This will result in short bundles, which are acceptable so long as they have a minimum weight according to the regulations (also, the USPS currently requires additional approval for this). The system can be programmed to check for minimum weight under these circumstances, and to reject bundles which fail. Furthermore, as the weight of different size bundles will vary, as well as the total number of items per bundle, other calculations and operations of the system will be affected. For example, in cost calculating operations (30), described below, postal rate will have to be determined individually for each bundle based on weight. In contrast, by providing all bundles in a maximized state, the total bundle weight will be calculated once, and used as a constant in all postal cost calculations.

The system should be flexible in order to process bundles of differing weights. This can happen, for instance, where it is desirable to have short bundles completed at the end of a general address string (5*b*). Such short bundles may be of differing weights depending on the number of items contained. The system can determine the particular bundle weight based (28) on the known weight per item, and then can effect further stages accordingly, such as palletizing and cost forecasting. Another instance is where pallets are to contain bundles of differing weights owing to a slightly different individual item weight. This may occur where, for example, certain items are to be given an insert, depending on the address. The resulting differing bundle weights can then be treated accordingly by the system.

In order to maximize all bundles, it is necessary to cross-reference information gathered as to the number of items to be placed in each maximized bundle with the actual address list. Preliminary analysis can be carried out by the system whereby a simulated bundling operation is envisioned (24). Whenever a new general address is reached in the list, a determination is made regarding the number of items which are still needed to maximize the bundle. That number is then fed back into the address generating program, and filler addresses at that same general address are added to the address list. When the addressing operation is in progress, items are addressed in the order of the address list, which should of course have individual addresses listed and processed sequentially within a general address. Filler individual addresses are also printed on items at the appropriate sequence (26), so that when the addressed items move to the bundling operation, the bundling apparatus can simply prepare bundles containing the maximum number of items (5*a*), without regard to address, as the coordination achieved by the system should result automatically in producing maximized bundles, each addressed only to a single general address.

A determination can also be made whether to fill a short bundle, or simply cancel the short bundle. For example, if a maximized bundle would comprise 15 items, a threshold of say 6 could be implemented. Therefore, a short bundle (i.e. the last for a particular general address) having 6 or more items would be filled to the maximum 15, while a short bundle having less than 6 would be simply cancelled from the operation. Calculations and simulations can be run as part of the system or method in order to automatically determine a desired threshold which would consider cost of additional filler items as part of the bulk mailing vs. cost of mailing the rejected pieces by alternative mailing methods, e.g. regular mail.

After the bundling operation (5), the bundles must be grouped onto pallets according to the regulations (7). Each pallet will then be dropped at the appropriate BMC, and therefore only bundles destined for the same BMC should be loaded together on a pallet. At this point, it is helpful if the computer can be instructed to print out a descriptive document identifying the contents and destination of the pallet, including the name of the BMC, the number of items, number of bundles, and total weight of the bundles. This information can be gathered through a tallying operation within the computer (9).

There are also minimum (32) and maximum (34) total weight requirements for the bundles loaded onto each pallet (although the current USPS regulations do allow for 10% of the pallets to be underweight). Predeterminations can be made by the system in order to optimize distribution of the bundles on one or more pallets (36) destined for the same BMC, so that all pallets fall within the required weight range, or so that a group of remainder bundles can default to a bag rather than a pallet. This information can then be communicated to bundling operation so that each bundle can be given a pallet number. If there is insufficient bundle weight to create even a single pallet of minimum weight, then the bundles will have to be redirected to an alternate BMC (16), or placed in a bag. This can be prevented by determining the ultimate pallet make-up in advance through simulation of the system. When determining if there are the minimum number of bundles to meet the requirements for a BMC, a weight calculation can also be performed or accessed, and checked to insure that minimum pallet weight is also satisfied. If not, then an alternate BMC will be assigned according to the same steps.

Once the pallets are prepared, they are optionally each delivered by the mailer to the appropriate BMC, and left for the USPS to take over. The USPS requires supporting documentation to go along with each mailing, and the system is uniquely set up to prepare whatever reports and documentation are required. Since address lists, item weight, number of items, number of bundles, make-up and number of pallets, bundle weight, pallet weight, zone rate information, etc. are all accumulated by the system for the processing operation, this information can be conveniently manipulated by the system to output flexible reports. For example, reports setting forth for each bundle, its zone, pallet/bag and postage amount; BMC entry summary, showing each BMC, the number of pieces and the postage and weight for each BMC; zip code summary, showing all zip codes and number of pieces and weight for each zip code; pallet/bag summary, showing number of pieces, weight of each pallet, and destination; quality control report; pallet/bag tags, showing information required the payload of each pallet; zone summary, showing number of pieces, weight and postage; and USPS Form 3605 mailing statement reports.

What is claimed is:

1. A system for processing a mailing consisting of a plurality of identical printed items to be grouped into bundles, each bundle having items with an identical general address, the system comprising:

means for calculating the maximum number of items of a given weight which can be grouped in a bundle, such that each bundle weighs less than or equal to a given maximum allowable weight, means for calculating the total weight of each maximized bundle, means for receiving postal rate information based on postal zones, means for receiving addressee information, including a general address having a zip code and particularized information for each addressee, wherein the means for receiving addressee information is capable of receiving a general address and individual addressee information in the form of range parameters for the general address, the system further comprising means for forming a series of individual addresses for the general address based on the range parameters, and means for calculating the postal rate for each bundle, wherein the postal rate for each bundle is calculated based on the total weight and postal zone for each bundle.

2. The system of claim 1, further comprising:

means for communicating the addressee information to a labeling apparatus, means for communicating the addressee information to a bundling apparatus, means for instructing the bundling apparatus to prepare bundles which consist of no more than the maximum number of allowable items and which satisfy a minimum required bundle weight.

3. The system of claim 2, further comprising means for providing instructions for loading the bundles onto pallets such that each pallet consists solely of bundles directed to a single BMC, and such that each pallet satisfies a minimum and maximum weight requirement.

4. The system of claim 3, further comprising means for calculating pallet information for each pallet including total number of bundles, total number of items and total weight of all bundles, and a pallet labeling means for outputting for each pallet a pallet label containing said pallet information and the particular BMC.

5. The system of claim 2, further comprising:

means for instructing the bundling apparatus to complete a previous bundle and to begin a new bundle when an item bearing a new general address enters a bundling stage in the bundling apparatus.

6. The system of claim 5, wherein the completion of the previous bundle comprises adding filler items going to the same general address in order to maximize the bundle.

7. The system of claim 5, further comprising means for comparing the number of items in a bundle to a specified threshold number, wherein the completion of the previous bundle comprises one of (a) in a case where the number of items in the previous bundle is greater than or equal to the threshold number, adding filler items going to the same general address in order to maximize the bundle, and (b) in a case where the number of items in the previous bundle is less than the threshold number, removing the previous bundle.

8. The system of claim 1, further comprising:

means for receiving information as to bulk mailing centers (BMC), each BMC associated with a group of zip codes, means for receiving information as to postal zones and rates to a particular zip code from the BMCs means for temporarily associating a bundle with a first BMC chosen from the information received as to BMCs, means for comparing the number of bundles associated with each first BMC to a given minimum required bundle count per BMC, for a first BMC for which the minimum required bundle count is not met, means for associating a second BMC for each bundle assigned to a first BMC, means for finally assigning each bundle to an appropriate BMC, and means for assigning the appropriate postal zone for each general address from the appropriate BMC to the zip code of each bundle.

9. The system of claim 8, wherein the second BMC is chosen, for all bundles temporarily assigned thereto, as the BMC geographically closest to the first BMC.

10. The system of claim 8, wherein the second BMC is chosen separately for each bundle so as to provide the lowest postal rate from the zip code of each bundle to a particular second BMC.

11. The system of claim 8, further comprising means for receiving the item weight.

12. The system of claim 11, further comprising means for receiving information as to the paper sheet weight, paper sheet size, and number of sheets of a certain weight and size, for each item, and means for calculating an item weight from said information.

13. A system for processing a mailing consisting of a plurality of identical printed items to be grouped into bundles, each bundle having items with an identical general address, the system comprising:

means for calculating the maximum number of items of a given weight which can be grouped in a bundle, such that each bundle weighs less than or equal to a given maximum allowable weight, and means for calculating the total weight of each maximized bundle, means for receiving information as to bulk mailing centers (BMC), each BMC associated with a group of zip codes, means for receiving information as to postal zones and rates to a particular zip code from the BMCs means for temporarily associating a bundle with a first BMC chosen from the information received as to BMCs, means for comparing the number of bundles associated with each first BMC to a given minimum required bundle count per BMC, for a first BMC for which the minimum required bundle count is not met, means for associating a second BMC for each bundle assigned to a first BMC, wherein the second BMC is chosen separately for each bundle so as to provide the lowest postal rate from the zip code of each bundle to a particular second BMC, means for finally assigning each bundle to an appropriate BMC, means for assigning the appropriate postal zone for each general address from the appropriate BMC to the zip code of each bundle, means for receiving addressee information, including a general address having a zip code and particularized information for each addressee, and means for calculating the postal rate for each bundle, wherein the postal rate for each bundle is calculated based on the total weight and postal zone for each bundle.

14. The system of claim 13, wherein the means for receiving addressee information further comprises means for identifying and rejecting addresses which are not compatible with given requirements.

15. The system of claim 13, wherein the means for receiving addressee information is capable of receiving a general address and individual addressee information in the form of range parameters for the general address, the system further comprising means for forming a series of individual addresses for the general address based on the range parameters.

16. The system of claim 13, further comprising means for receiving the item weight.

17. The system of claim 16, further comprising means for receiving information as to the paper sheet weight, paper sheet size, and number of sheets of a certain weight and size, for each item, and means for calculating an item weight from said information.

18. The system of claim 13, further comprising: means for communicating the addressee information to a labeling apparatus, means for communicating the addressee information to a bundling apparatus, means for instructing the bundling apparatus to prepare bundles which consist of no more than the maximum number of allowable items and which satisfy a minimum required bundle weight.

19. The system of claim 18, further comprising:

means for instructing the bundling apparatus to complete a previous bundle and to begin a new bundle when an item bearing a new general address enters a bundling stage in the bundling apparatus.

20. The system of claim 19, wherein the completion of the previous bundle comprises adding filler items going to the same general address in order to maximize the bundle.

21. The system of claim 18, further comprising means for providing instructions for loading the bundles onto pallets such that each pallet consists solely of bundles directed to a single BMC, and such that each pallet satisfies a minimum and maximum weight requirement.

22. The system of claim 21, further comprising means for calculating pallet information for each pallet including total number of bundles, total number of items and total weight of all bundles, and a pallet labeling means for outputting for each pallet a pallet label containing said pallet information and the particular BMC.

23. A system for processing a mailing consisting of a plurality of identical printed items to be grouped into bundles, each bundle having items with an identical general address, the system comprising:

means for calculating the maximum number of items of a given weight which can be grouped in a bundle, such that each bundle weighs less than or equal to a given maximum allowable weight, and means for calculating the total weight of each maximized bundle, means for receiving postal rate information based on postal zones, means for receiving addressee information, including a general address having a zip code and particularized information for each individual addressee, means for communicating the addressee information to a labeling apparatus, means for communicating the addressee information to a bundling apparatus, means for instructing the bundling apparatus to prepare bundles which consist of no more than the maximum number of allowable items and which satisfy a minimum required bundle weight, means for instructing the bundling apparatus to complete a previous bundle and to begin a new bundle when an item bearing a new general address enters a bundling stage in the bundling apparatus, wherein the completion of the previous bundle comprises adding filler items going to the same general address, but lacking particularized information for an individual address, in order to maximize the bundle, and means for calculating the postal rate for each bundle, wherein the postal rate for each bundle is calculated based on the total weight and postal zone for each bundle.

24. The system of claim 23, wherein the means for receiving addressee information further comprises means for identifying and rejecting addresses which are not compatible with given requirements.

25. The system of claim 23, wherein the means for receiving addressee information is capable of receiving a general address and individual addressee information in the form of range parameters for the general address, the system further comprising means for forming a series of individual addresses for the general address based on the range parameters.

26. The system of claim 23, further comprising means for providing instructions for loading the bundles onto pallets such that each pallet consists solely of bundles directed to a single BMC, and such that each pallet satisfies a minimum and maximum weight requirement.

27. The system of claim 26, further comprising means for calculating pallet information for each pallet including total number of bundles, total number of items and total weight of all bundles, and a pallet labeling means for outputting for each pallet a pallet label containing said pallet information and the particular BMC.

28. The system of claim 23, further comprising:

means for receiving information as to bulk mailing centers (BMC), each BMC associated with a group of zip codes, means for receiving information as to postal zones and rates to a particular zip code from the BMCs means for temporarily associating a bundle with a first BMC chosen from the information received as to BMCs, means for comparing the number of bundles associated with each first BMC to a given minimum required bundle count per BMC, for a first BMC the minimum required bundle count is not met, means for associating a second BMC for each bundle temporarily assigned to a first BMC, means for finally assigning each bundle to an appropriate BMC, and means for assigning the appropriate postal zone for each general address from the appropriate BMC to the zip code of each bundle.

29. The system of claim 28, wherein the second BMC is chosen, for all bundles temporarily assigned thereto, as the BMC geographically closest to the first BMC.

30. The system of claim 28, wherein the second BMC is chosen separately for each bundle so as to provide the lowest postal rate from the zip code of each bundle to a particular second BMC.

31. The system of claim 28, further comprising means for receiving the item weight.

32. The system of claim 31, further comprising means for receiving information as to the paper sheet weight, paper sheet size, and number of sheets of a certain weight and size, for each item, and means for calculating an item weight from said information.

33. A method for processing a mailing consisting of a plurality of identical printed items to be grouped into bundles, each bundle having items with an identical general address, the system comprising the steps of:

calculating the maximum number of items of a given weight which can be grouped in a bundle, such that each bundle weighs less than or equal to a given maximum allowable weight, and calculating the total weight of each maximized bundle, receiving postal rate information based on postal zones, receiving addressee information, including a general address having a zip code and particularized information for each individual addressee, wherein the address information is in the form of range parameters for the general address, further comprising forming a series of individual addresses for the general address based on the range parameters, and calculating the postal rate for each bundle, wherein the postal rate for each bundle is calculated based on the total weight and postal zone for each bundle.

34. The method of claim 33, further comprising:

communicating the addressee information to a labeling apparatus, communicating the addressee information to a bundling apparatus, and instructing the bundling apparatus to prepare bundles which consist of no more than the maximum number of allowable items and which satisfy a minimum required bundle weight.

35. The method of claim 34, further comprising providing instructions for loading the bundles onto pallets such that each pallet consists solely of bundles directed to a single BMC, and such that each pallet satisfies a minimum and maximum weight requirement.

36. The method of claim 35, further comprising calculating pallet information for each pallet including total number of bundles, total number of items and total weight of all bundles, and outputting for each pallet a pallet label containing said pallet information and the particular BMC.

37. The method of claim 34, further comprising:

instructing the bundling apparatus to complete a previous bundle and to begin a new bundle when an item bearing a new general address enters a bundling stage in the bundling apparatus.

38. The method of claim 37, wherein the completion of the previous bundle comprises adding filler items going to the same general address in order to maximize the bundle.

39. The method of claim 37, further comprising comparing the number of items in a bundle to a specified threshold number, wherein the completion of the previous bundle comprises one of (a) in a case where the number of items in the previous bundle is greater than or equal to the threshold number, adding filler items going to the same general address in order to maximize the bundle, and (b) in a case where the number of items in the previous bundle is less than the threshold number, removing the previous bundle.

40. The method of claim 33, further comprising:

receiving information as to bulk mailing centers (BMC), each BMC associated with a group of zip codes, receiving information as to postal zones and rates to a particular zip code from the BMCs temporarily associating a bundle with a first BMC chosen from the information received as to BMCs, comparing the number of bundles associated with each first BMC to a given minimum required bundle count per BMC, for each first BMC for which the minimum required bundle count is not met, associating a second BMC for each bundle temporarily assigned to said first BMC, finally assigning each bundle to an appropriate BMC, and assigning the appropriate postal zone for each general address from the appropriate BMC to the zip code of each bundle.

41. The method of claim 40, wherein the second BMC is chosen, for all bundles temporarily assigned thereto, as the BMC geographically closest to the first BMC.

42. The method of claim 40, wherein the second BMC is chosen separately for each bundle so as to provide the lowest postal rate from the zip code of each bundle to a particular second BMC.

43. The method claim 33, further comprising receiving the item weight.

44. The method of claim 43, further comprising receiving information as to the paper sheet weight, paper sheet size, and number of sheets of a certain weight and size, for each item, and calculating an item weight from said information.

45. A method for processing a mailing consisting of a plurality of identical printed items to be grouped into bundles, each bundle having items with an identical general address, comprising the steps of:

calculating the maximum number of items of a given weight which can be grouped in a bundle, such that each bundle weighs less than or equal to a given maximum allowable weight, and calculating the total weight of each maximized bundle, receiving information as to bulk mailing centers (BMC), each BMC associated with a group of zip codes, receiving information as to postal zones and rates to a particular zip code from the BMCs temporarily associating a bundle with a first BMC chosen from the information received as to BMCs, comparing the number of bundles associated with each first BMC to a given minimum required bundle count per BMC, for each first BMC for which the minimum required bundle count is not met, associating a second BMC for each bundle temporarily assigned to said first BMC, wherein the second BMC is chosen separately for each bundle so as to provide the lowest postal rate from the zip code of each bundle to a particular second BMC, finally assigning each bundle to an appropriate BMC, assigning the appropriate postal zone for each general address from the appropriate BMC to the zip code of each bundle, receiving addressee information, including a general address having a zip code and particularized information for each addressee, and calculating the postal rate for each bundle, wherein the postal rate for each bundle is calculated based on the total weight and postal zone for each bundle.

46. The method of claim 45, wherein receiving addressee information further comprises identifying and rejecting addresses which are not compatible with given requirements.

47. The system of claim 45, wherein addressee information is in the form of range parameters for the general address, the system further comprising forming a series of individual addresses for the general address based on the range parameters.

48. The method of claim 45, further comprising receiving the item weight.

49. The method of claim 48, further comprising receiving information as to the paper sheet weight, paper sheet size, and number of sheets of a certain weight and size, for each item, and calculating an item weight from said information.

50. The method of claim 45, further comprising:

communicating the addressee information to a labeling apparatus, communicating the addressee information to a bundling apparatus, and instructing the bundling apparatus to prepare bundles which consist of no more than the maximum number of allowable items and which satisfy a minimum required bundle weight.

51. The method of claim 50, further comprising:

instructing the bundling apparatus to complete a previous bundle and to begin a new bundle when an item bearing a new general address enters a bundling stage in the bundling apparatus.

52. The method of claim 51, wherein the completion of the previous bundle comprises adding filler items going to the same general address in order to maximize the bundle.

53. The method of claim 50, further comprising providing instructions for loading the bundles onto pallets such that each pallet consists solely of bundles directed to a single BMC, and such that each pallet satisfies a minimum and maximum weight requirement.

54. The method of claim 53, further comprising calculating pallet information for each pallet including total number of bundles, total number of items and total weight of all bundles, and a pallet labeling means for outputting for each pallet a pallet label containing said pallet information and the particular BMC.

55. A method for processing a mailing consisting of a plurality of identical printed items to be grouped into bundles, each bundle having items with an identical general address, the system comprising the steps calculating the maximum number of items of a given weight which can be grouped in a bundle, such that each bundle weighs less than or equal to a given maximum allowable weight, calculating the total weight of each maximized bundle, receiving postal rate information based on postal zones, receiving addressee information, including a general address having a zip code and particularized information for each individual addressee, communicating the addressee information to a labeling apparatus, communicating the addressee information to a bundling apparatus, instructing the bundling apparatus to prepare bundles which consist of no more than the maximum number of allowable items and which satisfy a minimum required bundle weight, instructing the bundling apparatus to complete a previous bundle and to begin a new bundle when an item bearing a new general address enters a bundling stage in the bundling apparatus, wherein the completion of the previous bundle comprises adding filler items going to the same general address, but lacking particularized information for an individual addressee, in order to maximize the bundle, and calculating the postal rate for each bundle, wherein the postal rate for each bundle is calculated based on the total weight and postal zone for each bundle.

56. The method of claim 55, further comprising identifying and rejecting addresses which are not compatible with given requirements.

57. The method of claim 55; wherein the addressee information is in the form of range parameters for the general address, the method further comprising forming a series of individual addresses for the general address based on the range parameters.

58. The method of claim 55, further comprising providing instructions for loading the bundles onto pallets such that each pallet consists solely of bundles directed to a single BMC, and such that each pallet satisfies a minimum and maximum weight requirement.

59. The method of claim 58, further comprising calculating pallet information for each pallet including total number of bundles, total number of items and total weight of all bundles, and outputting for each pallet a pallet label containing said pallet information and the particular BMC.

60. The method of claim 55, further comprising:

receiving information as to bulk mailing centers (BMC), each BMC associated with a group of zip codes, receiving information as to postal zones and rates to a particular zip code from the BMCs temporarily associating a bundle with a first BMC chosen from the information received as to BMCs, comparing the number of bundles associated with each first BMC to a given minimum required bundle count per BMC, for each first BMC for which the minimum required bundle count is not met, associating a second BMC for each bundle temporarily assigned to said first BMC, finally assigning each bundle to an appropriate BMC, and assigning the appropriate postal zone for each general address from the appropriate BMC to the zip code of each bundle.

61. The method of claim 60, wherein the second BMC is chosen, for all bundles temporarily assigned thereto, as the BMC geographically closest to the first BMC.

62. The method of claim 60, wherein the second BMC is chosen separately for each bundle so as to provide the lowest postal rate from the zip code of each bundle to a particular second BMC.

63. The method of claim 60, further comprising receiving the item weight.

64. The method of claim 63, further comprising receiving information as to the paper sheet weight, paper sheet size, and number of sheets of a certain weight and size, for each item, and calculating an item weight from said information.

* * * * *